United States Patent
Chung et al.

(10) Patent No.: US 11,836,192 B2
(45) Date of Patent: Dec. 5, 2023

(54) METHOD OF COLLECTING AND PREPROCESSING LEARNING DATA OF ARTIFICIAL INTELLIGENCE MODEL TO PERFORM DARK WEB DOCUMENT CLASSIFICATION

(71) Applicant: S2W INC., Seongnam-si (KR)

(72) Inventors: Jin Woo Chung, Seongnam-si (KR); Yong Jae Lee, Seongnam-si (KR); Sang Duk Suh, Seongnam-si (KR)

(73) Assignee: S2W INC., Seongnam-si (KR)

(*) Notice: Subject to any disclaimer, the term of this patent is extended or adjusted under 35 U.S.C. 154(b) by 0 days.

(21) Appl. No.: 17/842,350

(22) Filed: Jun. 16, 2022

(65) Prior Publication Data

US 2023/0252089 A1    Aug. 10, 2023

(30) Foreign Application Priority Data

Feb. 8, 2022 (KR) .................. 10-2022-0016412

(51) Int. Cl.
| | |
|---|---|
| *G06F 7/02* | (2006.01) |
| *G06F 16/00* | (2019.01) |
| *G06F 16/93* | (2019.01) |
| *G06N 3/08* | (2023.01) |
| *G06F 16/955* | (2019.01) |
| *G06F 16/951* | (2019.01) |

(52) U.S. Cl.
CPC .......... *G06F 16/93* (2019.01); *G06F 16/951* (2019.01); *G06F 16/955* (2019.01); *G06N 3/08* (2013.01)

(58) Field of Classification Search
CPC ...... G06F 16/93; G06F 16/955; G06F 16/951; G06N 3/08
See application file for complete search history.

(56) References Cited

U.S. PATENT DOCUMENTS

| | | | |
|---|---|---|---|
| 2008/0097972 A1* | 4/2008 | Gordon | G06F 16/93 |
| 2021/0064708 A1* | 3/2021 | Dellinger | G06F 17/40 |

(Continued)

FOREIGN PATENT DOCUMENTS

KR    10-2019-0013426 A    2/2019

OTHER PUBLICATIONS

Takaaki, Sugio et al "Dark Web Content Analysis and Visualization," ACM International Workshop on Security and Privacy Analytics (IWSPA), Mar. 2019. (Year: 2019).*

(Continued)

*Primary Examiner* — Bruce M Moser
(74) *Attorney, Agent, or Firm* — Sughrue Mion, PLLC (57) ABSTRACT

The present disclosure relates to a method of collecting, by a terminal, learning data of an artificial intelligence model to perform dark web document classification, the method including: generating a first word set masked with a first identifier based on text included in a first dark web document; generating a second word set masked with a second identifier based on text included in a second dark web document; calculating a similarity by comparing the first word set and the second word set; and, based on the similarity, collecting the second dark web document in a second storage unit when the similarity does not exceed a specific value, and discarding the second dark web document when the similarity exceeds the specific value.

8 Claims, 9 Drawing Sheets

(56) References Cited

U.S. PATENT DOCUMENTS

2022/0179892 A1* 6/2022 Kermode ................ G06N 3/08
2023/0032208 A1* 2/2023 Kobren ................ G06F 18/214

OTHER PUBLICATIONS

He, Siyu et al, "Classification of Illegal Activities on the Dark Web," ICISS 2019 Mar. 6-19, 2019, taken from https://dl.acm.org/doi/pdf/10.1145/3322645.3322691. (Year: 2019).*

* cited by examiner

| | TYPE OF IDENTIFIER | DESCRIPTION AND EXAMPLE | RELATED SUBJECT |
|---|---|---|---|
| 1 | ID_IP_ADDRESS | IP ADDRESS | HACKING |
| 2 | ID_EMAIL | E-MAIL ADDRESS | DRUGS, FINANCE, WEAPONS (FOR INQUIRY) |
| 3 | ID_ONION_URL | DARK WEB URL ADDRESS | COMMON |
| 4 | ID_NORMAL_URL | GENERAL URL ADDRESS (ETC.) | COMMON |
| 5 | ID_BTC_ADDRESS | BITCOIN WALLET ADDRESS | DRUGS, FINANCE, WEAPONS (TRANSACTION ACCOUNT) |
| 6 | ID_ETH_ADDRESS | ETHEREUM WALLET ADDRESS | |
| 7 | ID_LTC_ADDRESS | LITECOIN WALLET ADDRESS | |
| 8 | ID_GENERAL_MONEY | GENERAL CURRENCY AMOUNT (10 USD) | DRUGS, FINANCE, WEAPONS (TRANSACTION AMOUNT) |
| 9 | ID_CRYPTO_MONEY | CRYPTO CURRENCY AMOUNT (0.01 BTC) | DRUGS, FINANCE, WEAPONS (TRANSACTION AMOUNT) |
| 10 | ID_WEIGHT | WEIGHT (10kg) | DRUGS (SALES UNIT) |
| 11 | ID_LENGTH | LENGTH (10cm) | WEAPONS (TYPES AND SIZES) |
| 12 | ID_VOLUME | VOLUME (10ml) | DRUGS (SALES UNIT) |
| 13 | ID_TIME | TIME (2000-01-01 09:00) | FORUM (POST CREATION TIME) |
| 14 | ID_PERCENTAGE | PERCENTAGE (50%) | DRUGS (SPECIFIC MATERIAL CONTENT) |
| 15 | ID_FILENAME | FILE NAME (xxx.zip) | HACKING (LEAKED FILE TYPE) |
| 16 | ID_FILESIZE | FILE SIZE (10MB) | HACKING (LEAKED FILE SIZE) |
| 17 | ID_VERSION | VERSION NAME (version 5.0) | HACKING (SOFTWARE) |
| 18 | ID_NUMBER | ALL OTHER NUMBERS | |

METHOD OF COLLECTING AND PREPROCESSING LEARNING DATA OF ARTIFICIAL INTELLIGENCE MODEL TO PERFORM DARK WEB DOCUMENT CLASSIFICATION

CROSS-REFERENCE TO RELATED APPLICATION

This application claims priority to and the benefit of Korean Patent Application No. 10-2022-0016412, filed on Feb. 8, 2022, the disclosure of which is incorporated herein by reference in its entirety.

BACKGROUND

1. Field of the Invention

The present disclosure relates to a method and apparatus for collecting and preprocessing learning data of an artificial intelligence model to perform dark web document classification using deep learning technology.

2. Discussion of Related Art

The dark web is a part of the web and is an information system operated based on anonymous network technology. Here, the World Wide Web (web) is an application technology that enables information sharing between computers connected to a network (e.g., the Internet).

In order to produce an artificial intelligence model that automatically classifies subjects (e.g., pornography/drugs/hacking/weapons, etc.) of such dark web documents, learning data labeled with the subjects is required.

For example, a process of producing such learning data may be largely divided into the following two steps. The process includes crawling web documents, and then labeling data of the crawled dark web documents with the subjects of the crawled document.

However, the dark web documents have unique characteristics, unlike surface web documents of the general web, and thus have a problem in that it is difficult to produce high-quality learning data when performing the crawling or labeling in a general way.

SUMMARY OF THE INVENTION

The present disclosure is directed to providing a method of collecting and preprocessing learning data of an artificial intelligence model to perform dark web document classification using deep learning technology.

Objects of the present disclosure are not limited to the above-described objects. That is, other objects that are not described may be obviously understood by those skilled in the art to which the present disclosure pertains from the following detailed description.

According to an aspect of the present disclosure, a method of collecting, by a terminal, learning data of an artificial intelligence model to perform dark web document classification may include: generating a first word set masked with a first identifier based on text included in a first dark web document; generating a second word set masked with a second identifier based on text included in a second dark web document; calculating a similarity by comparing the first word set and the second word set; and, based on the similarity, collecting the second dark web document in a second storage unit when the similarity does not exceed a specific value, and discarding the second dark web document when the similarity exceeds the specific value.

The method may further include temporarily collecting dark web documents based on a uniform resource locator (URL) stored in a first storage unit, in which the temporarily collected dark web documents may include the first dark web document and the second dark web document.

The masking may be based on an identifier table set in the terminal, and the identifier table may include (1) a type of masked identifier and (2) subject information related to the masked identifier.

The masking may include converting a word included in the text into an identifier indicating a higher meaning of the word.

The similarity may be a Jaccard similarity based on a union and an intersection of the first word set and the second word set.

The specific value may be set based on the subject information related to the masked identifier.

The method may further include training the artificial intelligence model based on the second storage unit.

According to another aspect of the present disclosure, a terminal collecting learning data of an artificial intelligence model to perform dark web document classification may include: a first storage unit configured to store a URL of a dark web; a second storage unit configured to store a dark web document to be used as the learning data; and a processor configured to functionally control the first storage unit and the second storage unit, in which the processor may generate a first word set masked with a first identifier based on text included in a first dark web document, generate a second word set masked with a second identifier based on text included in a second dark web document, compare the first word set and the second word set to calculate a similarity, and based on the similarity, collect the second dark web document in the second storage unit when the similarity does not exceed a specific value, and discard the second dark web document when the similarity exceeds the specific value.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

The accompanying drawings, which are included as part of the detailed description to assist understanding of the present disclosure, illustrate embodiments of the present disclosure and explain the technical features of the present disclosure together with the detailed description.

DETAILED DESCRIPTION OF EXEMPLARY EMBODIMENTS

Hereinafter, embodiments of the present disclosure will be described in detail with reference to the accompanying drawings. The same or similar components will be denoted by the same reference numerals independent of the drawing numerals, and an overlapping description of the same or similar components will be omitted. In addition, the terms "module" and "unit" for components used in the following description are used only to make the disclosure easier. Therefore, these terms do not have meanings or roles that are distinguished from each other in themselves. In addition, in describing the embodiments disclosed in the present disclosure, when it is determined that detailed description of a related known technology may obscure the gist of the embodiment disclosed in the present disclosure, such detailed description will be omitted. Further, it should be understood that the attached drawings are only for easy understanding of the embodiments disclosed in the present disclosure, do not limit the technical idea disclosed in the present disclosure, and include all changes, equivalents or substitutes included in the spirit and scope of the present disclosure.

Terms including ordinal numbers such as "first," "second," and the like may be used to describe various components. However, these components are not limited by these terms. The terms are used only to distinguish one component from another component.

It is to be understood that when one component is referred to as being "connected to" or "coupled to" another component, the one component may be connected directly to or coupled directly to another component or may be connected to or coupled to another component with still another component interposed therebetween. On the other hand, it should be understood that when one element is referred to as being "connected directly to" or "coupled directly to" another element, it may be connected to or coupled to another element without other elements interposed therebetween.

Singular forms are intended to include plural forms unless the context clearly indicates otherwise.

It will be further understood that terms "include" or "have" used in the present disclosure specify the presence of features, numerals, steps, operations, components, or parts described in the present disclosure, or combinations thereof, but do not preclude the presence or addition of one or more other features, numerals, steps, operations, components, parts, or combinations thereof.

Figure 1:
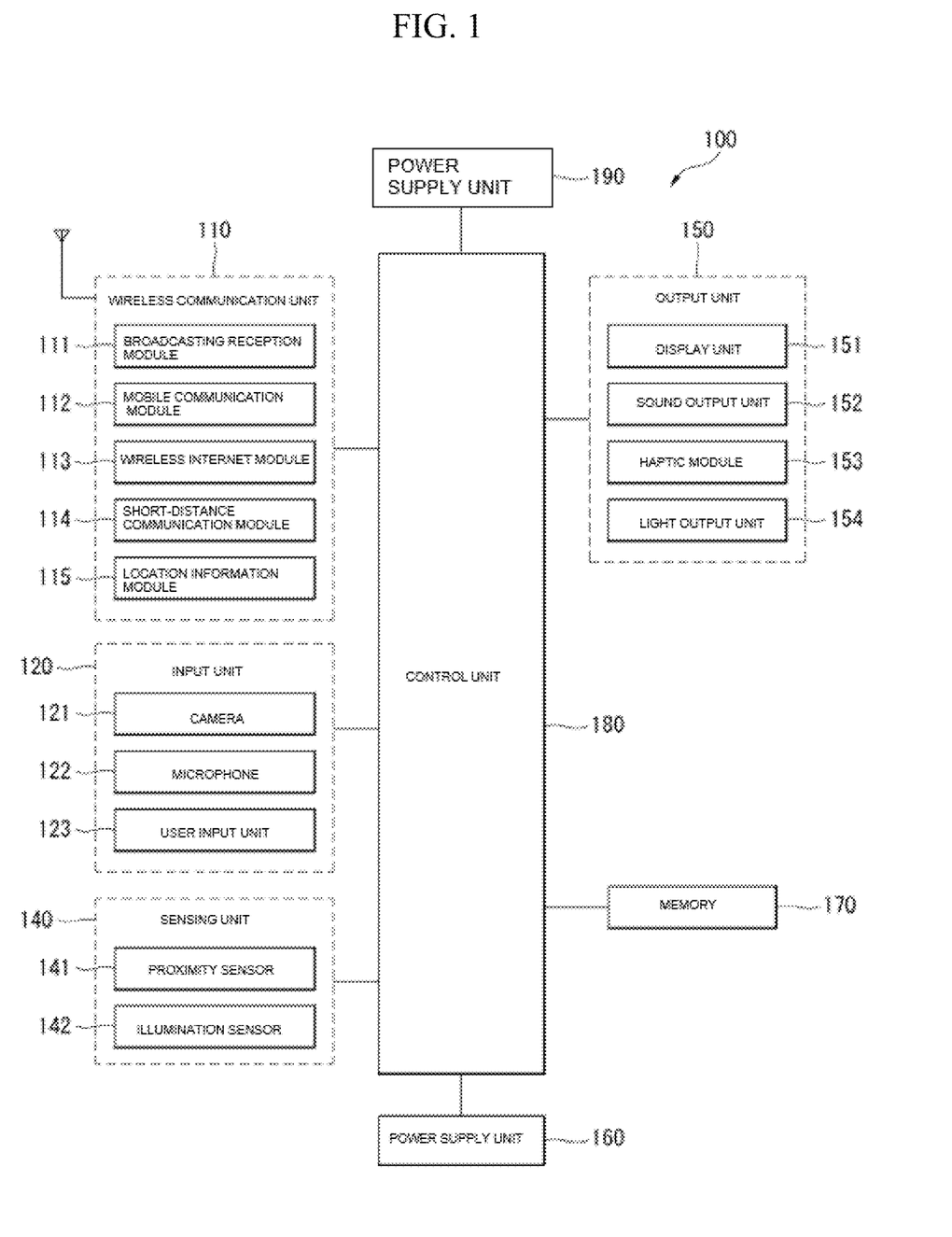
FIG. 1 is a block diagram for describing an electronic device related to the present disclosure.

FIG. 1 is a block diagram for describing an electronic device related to the present disclosure.

The electronic device 100 may include a wireless communication unit 110, an input unit 120, a sensing unit 140, an output unit 150, an interface unit 160, a memory 170, a control unit 180, a power supply unit 190, and the like. The components illustrated in FIG. 1 are not essential to implementing electronic devices, and the electronic devices described herein may have more or fewer components than those listed above.

More specifically, the wireless communication unit 110 of the components may include one or more modules which enable wireless communication between the electronic device 100 and a wireless communication system, between the electronic device 100 and other electronic devices 100, or between the electronic device 100 and an external server. In addition, the wireless communication unit 110 may include one or more modules which connect the electronic device 100 to one or more networks.

The wireless communication unit 110 may include at least one of a broadcast receiving module 111, a mobile communication module 112, a wireless Internet module 113, a short range communication module 114, and a location information module 115.

The input unit 120 may include a camera 121 or an image input unit for inputting an image signal, a microphone 122 or an audio input unit for inputting an audio signal, or a user input unit 123 (for example, a touch key, a mechanical key, or the like) for receiving information from a user. Voice data or image data collected by the input unit 120 may be analyzed and processed as a control command of a user.

The sensing unit 140 may include one or more sensors for sensing at least one of information in the electronic device, surrounding environment information around the electronic device, and user information. For example, the sensing unit 140 may include at least one of a proximity sensor 141, an illuminance sensor 142, a touch sensor, an acceleration sensor, a magnetic sensor, a gravity sensor (G-sensor), a gyroscope sensor, a motion sensor, an RGB sensor, an infrared sensor (IR sensor), a finger scan sensor, an ultrasonic sensor, an optical sensor (for example, a camera (see 121)), a microphone (see 122), a battery gauge, an environmental sensor (for example, a barometer, a hygrometer, a thermometer, a radiation detection sensor, a heat detection sensor, a gas detection sensor, or the like), and a chemical sensor (for example, an electronic nose, a healthcare sensor, a biometric sensor, or the like). Meanwhile, the electronic device disclosed herein may use a combination of information sensed by at least two or more of these sensors.

The output unit 150 is used to generate an output related to the sense of vision, the sense of hearing, the sense of touch, or the like, and may include at least one of a display unit 151, a sound output unit 152, a haptic module 153, and an optical output unit 154. The display unit 151 may form a layer structure with the touch sensor or may be integrally formed with the touch sensor, thereby implementing a touch screen. The touch screen may function as the user input unit 123 which provides an input interface between the electronic device 100 and the user, and may provide an output interface between the electronic device 100 and the user.

The interface unit 160 serves as a path of various types of external devices connected to the electronic device 100. The interface unit 160 may include at least one of a wired/wireless headset port, an external charger port, a wired/wireless data port, a memory card port, a port for connecting devices including an identity module, an audio input/output (I/O) port, a video input/output (I/O) port, an earphone port, and the like. The electronic device 100 may perform appropriate control related to the connected external device in response to the connection of the external device to the interface unit 160.

In addition, the memory 170 stores data supporting various functions of the electronic device 100. The memory 170 may store a plurality of application programs (or applications) that are driven by the electronic device 100, and data and instructions for operating the electronic device 100. At least some of these application programs may be downloaded from the external server via the wireless communication. In addition, at least some of these application programs may exist on the electronic device 100 from the time of shipment for basic functions (for example, an incoming and outgoing call function and a message reception and transmission function) of the electronic device 100. Meanwhile, the application program may be stored in the memory 170 and installed on the electronic device 100, and thus may be driven by the control unit 180 to perform the operation (or function) of the electronic device.

In addition to the operation related to the application program, the control unit 180 typically controls the overall operation of the electronic device 100. The control unit 180 may provide or process appropriate information or a function for a user by processing signals, data, information, and the like, which are input or output through the above-described components, or by driving the application program stored in the memory 170.

In addition, the control unit 180 may control at least some of the components described with reference to FIG. 1 to drive the application program stored in the memory 170. In addition, the control unit 180 may operate at least two or more of the components included in the electronic device 100 in combination with each other to drive the application program.

The power supply unit 190 receives power from an external power supply and an internal power supply under the control of the control unit 180 and supplies the received power to each component included in the electronic device 100. The power supply unit 190 includes a battery, which may be a built-in battery or a replaceable type battery.

At least some of the components may operate in cooperation with each other in order to implement an operation, control, or a control method of the electronic device according to various embodiments to be described below. In addition, the operation, control, or control method of the electronic device may be implemented on the electronic device by driving at least one application program stored in the memory 170.

In the present disclosure, the electronic device 100 may be collectively referred to as a terminal.

Figure 2:
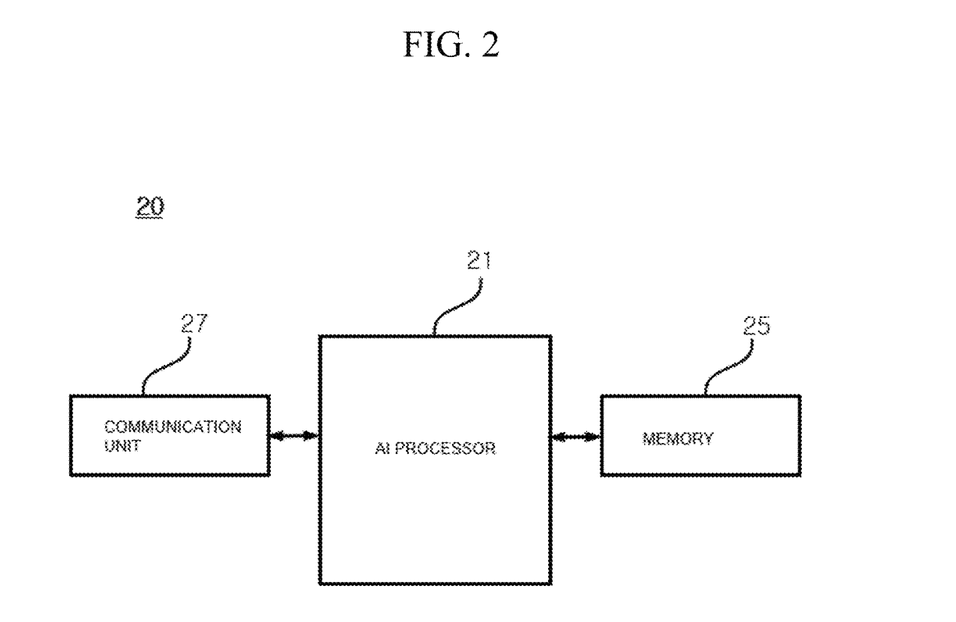
FIG. 2 is a block diagram of an artificial intelligence (AI) device according to an embodiment of the present disclosure.

FIG. 2 is a block diagram of an artificial intelligence (AI) device according to an embodiment of the present disclosure.

The AI device 20 may include an electronic device including an AI module capable of performing AI processing, a server including the AI module, or the like. In addition, the AI device 20 may be included in at least a part of the electronic device 100 shown in FIG. 1 and may be provided to perform at least a part of the AI processing together.

The AI device 20 may include an AI processor 21, a memory 25, and/or a communication unit 27.

The AI device 20 is a computing device capable of training neural networks, and may be implemented as any of various electronic devices such as a server, a desktop personal computer (PC), a notebook PC, and a tablet PC.

The AI processor 21 may train the neural network using a program stored in the memory 25. In particular, the AI processor 21 may generate an AI model to perform dark web document classification.

Meanwhile, the AI processor 21 performing the functions as described above may be a general purpose processor (for example, a central processing unit (CPU)), or may be an AI-dedicated processor (for example, a graphics processing unit (GPU)) for training AI.

The memory 25 may store various programs and data necessary for the operation of the AI device 20. The memory 25 may be implemented as a non-volatile memory, a volatile memory, a flash-memory, a hard disk drive (HDD), a solid state drive (SDD), or the like. The memory 25 is accessed by the AI processor 21, and reading/writing/modification/deletion/update or the like of data by the AI processor 21 may be performed. Also, the memory 25 may store a neural network model (for example, a deep learning model) generated through a learning algorithm for data classification/recognition according to an embodiment of the present disclosure.

Meanwhile, the AI processor 21 may include a data learning unit that trains a neural network for data classification/recognition. For example, the data learning unit may acquire learning data to be used for training, and apply the acquired learning data to the deep learning model, thereby making it possible to train the deep learning model.

The communication unit 27 may transmit the AI processing result by the AI processor 21 to an external electronic device.

Here, the external electronic device may include other terminals and servers.

Meanwhile, although the AI device 20 illustrated in FIG. 2 has been described as being functionally classified into the AI processor 21, the memory 25, the communication unit 27, and the like, the above-described components are integrated into one module, which may be referred to as an AI module.

Figure 3:
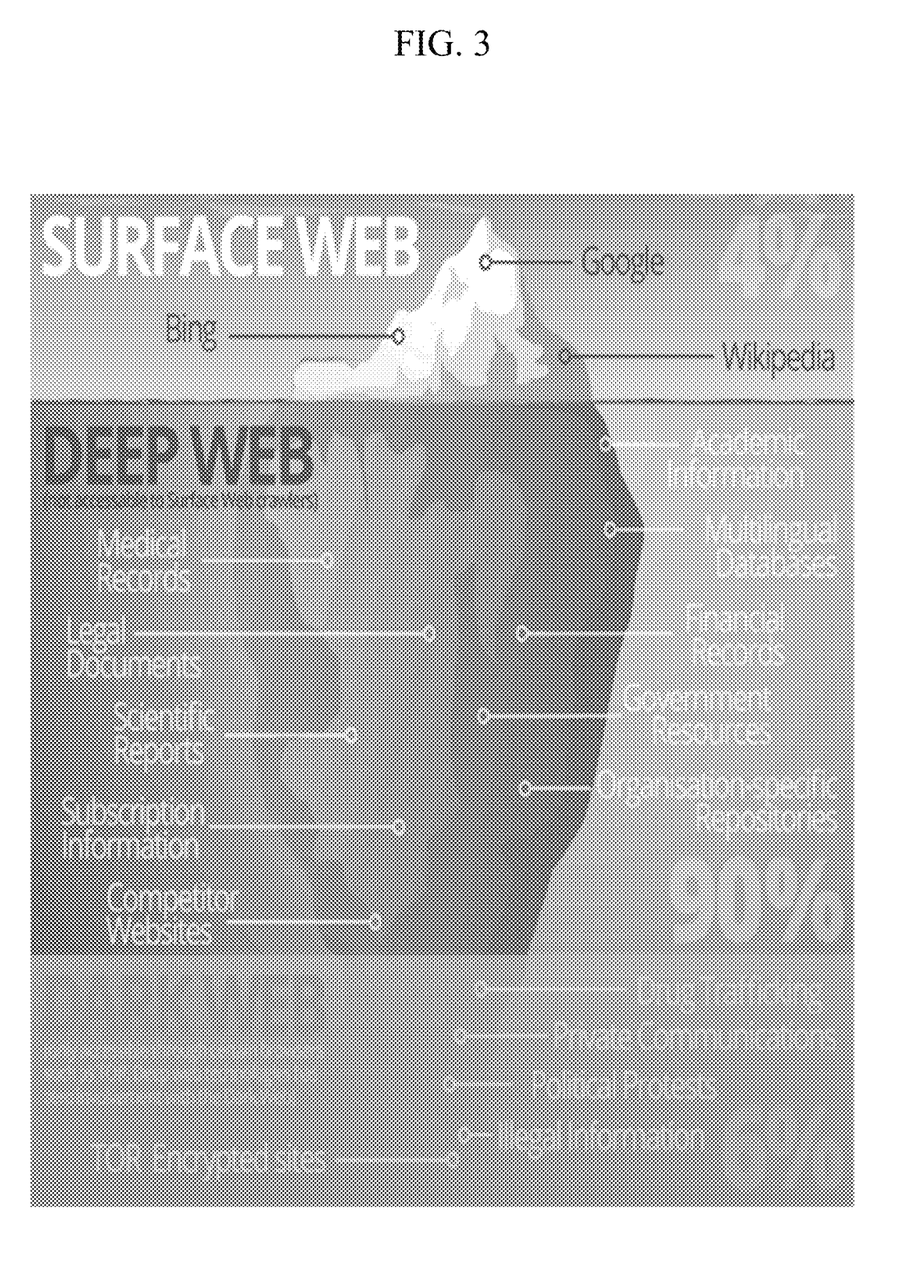
FIG. 3 is an example of a dark web applicable to the present disclosure.

FIG. 3 is an example of a dark web applicable to the present disclosure.

Referring to FIG. 3, the web may be classified into (1) a surface web, (2) a deep web, and (3) a dark web.

The surface web may include information that is searchable or freely available to the general public, and most websites known to the general public (e.g., Google, Wikipedia) are operated on the surface web.

The deep web may be a web in which searching or free access by the general public is restricted. The deep web (for example, websites of government agencies, research institutes, schools, hospitals, or corporate intranets) may be accessed by knowing an Internet protocol (IP) address or a uniform resource locator (URL) of the web server. However, to this end, access rights such as logging into the site may be required.

Lastly, the dark web uses anonymous network technology with enhanced anonymity, making it impossible to track users. In addition, access to the dark web may be possible only by using a specific web browser. The dark web was developed to combat anti-government activities or censorship, but is now mainly used for illegal activities such as cyber crime and terrorism.

Accordingly, such dark web document classification is becoming an important issue in Internet security. Dark web documents have the following important features.

(1) Many Duplicate Pages

Since there is no cost for hosting on the dark web due to its nature, it is possible to mass-produce similar dark web pages. For example, the dark web documents may include pages that are complete clones of each other, and pages that differ only in a very minor part (for example, different pages with the same type of drug price list but with different prices, pages with the same type of pornography sharing site but with slightly different pictures/names).

Even if the amount of learning data of the AI model for dark web document classification is large, when a proportion of duplicate pages is high, learning efficiency may decrease and unnecessary labeling costs may be involved. Therefore, a method of detecting a duplicate in advance during crawling of dark web documents, and excluding the detected dark web document from labeling is required.

(2) Description of Various Identifiers that do not Appear Well on Surface Web

A dark web document may include various identifiers which do not appear well on a surface web, such as a cryptocurrency wallet address (e.g., transaction means such as Bitcoin, Ethereum, Litecoin, etc.), a cryptocurrency amount (e.g., mainly used to display a price and transaction amount of a product for sale), a dark web Page URL, an IP address (e.g., hacking or personal information leakage, etc.), an e-mail address (e.g., contact sharing, personal information leakage, etc.), numbers and units (e.g., for transactions of, for example, pornography, drugs, weapons, etc.), an amount, a weight, a quantity, and a file size.

These identifiers are mainly in the form of complex strings in which English and numbers are randomly listed, and therefore their meanings cannot be ascertained in that form. By making a machine learning model unnecessarily analyze a pattern of such a complex string, an overfitting problem for learning data may be caused.

In addition, when looking at pages with duplicate content, in most cases, all other parts are the same, but only the identifier part is different (e.g., price fluctuation on drug sales sites). Therefore, it is necessary to prevent the overfitting problem by masking these identifiers with the same symbol before performing the machine learning.

Figure 4:
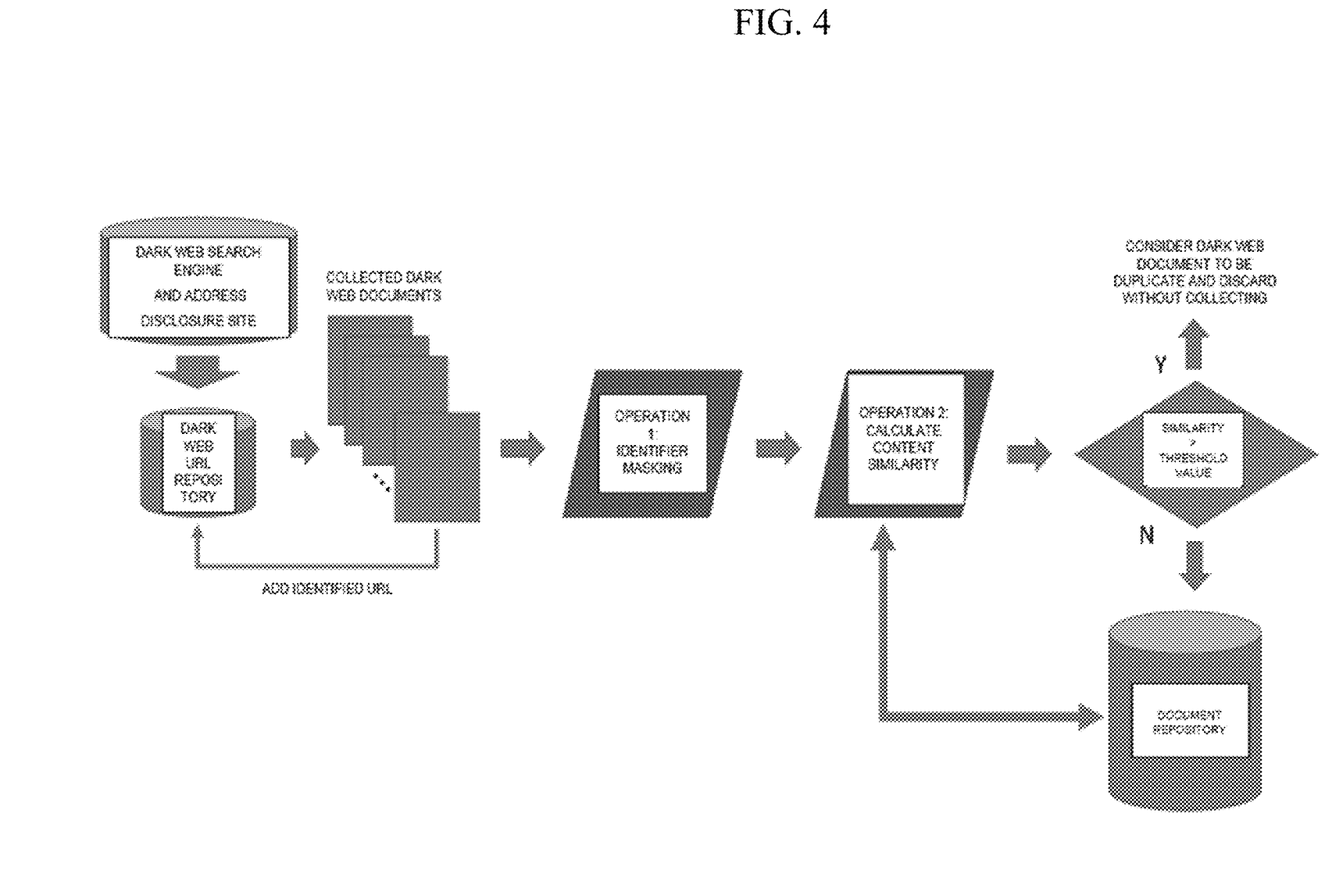
FIG. 4 is an example of a method of collecting a dark web document to which the present disclosure may be applied.

FIG. 4 is an example of a method of collecting a dark web document to which the present disclosure may be applied.

Referring to FIG. 4, the terminal may be connected to the AI device 20 to perform a method of collecting dark web documents for generating an AI model to perform dark web document classification. Here, the dark web documents may be data in the form of documents.

The terminal may fetch a dark web site address (URL) organized on the surface web (i.e., general web) and store the fetched dark web site address inside (dark web URL repository).

A dark web search engine and an address disclosure site for this purpose include, for example, the following:
  Dark web search engine Ahmia (https://ahmia.fi)
  Collection of dark website addresses (e.g., https://github-.com/alecmuffett/real-world-onion-sites)

The terminal may sequentially visit all stored URLs through an anonymous network technology (e.g., The Onion Router (Tor) browser) to collect (crawl) web documents (web page codes) of the corresponding site.

For example, The Onion Router (Tor) may have the following features.
  Open Source: First started at the US Naval Research Laboratory (NRL), currently maintained/managed by the Tor project foundation
  Overlay Network: Built by autonomously participating peers around the world, encrypted at an application layer among OSI 7 layers
  Reinforcement of security and privacy protection: Transmitting and receiving encrypted data through relay nodes on the Internet The terminal may collect and store another URL mentioned in the collected web document. In this way, the size of the data stored in the dark web URL repository may preferably be increased.

The terminal may repeatedly collect the above-described dark web URL until the target collection amount is obtained. The terminal may not redundantly visit the previously visited URL.

A terminal ready to collect dark web documents may perform operation 1, an identifier masking operation.

Figure 5:
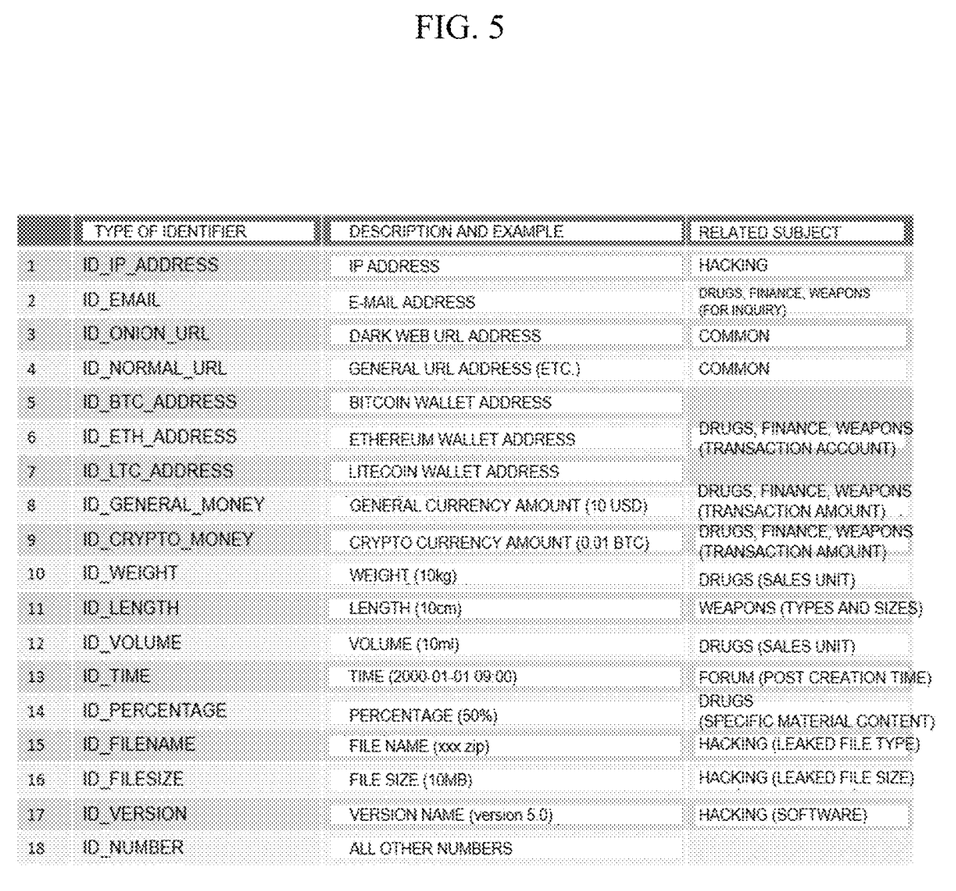
FIG. 5 is an example of an identifier type to which the present disclosure may be applied.

FIG. 5 is an example of an identifier type to which the present disclosure may be applied.

FIG. 5 illustrates an identifier type in which the terminal performs the identifier masking.

All targets of the identifier masking may be identified by regular expressions in text.

The terminal may unify (i.e., mask) strings of various patterns into a common symbol, thereby making it easier for a machine to process the unified strings (e.g., notify the machine that "10 kg," "20 lbs," and "200 mg" mean "weight" regardless of number/unit).

In addition, the type and distribution of identifier masking is related to a specific subject in a dark web document, which may also help a machine automatically classify the subject.

That is, some identifiers may help classify the subject of the document.

For example, the frequent mention of the identifier "weight" is highly likely to be drug-related topics (this is because when drugs are sold, drugs are sold by weight), and frequent mention of the file size is highly likely to indicate a hacking site (which is used to indicate a scale of information leaked due to hacking).

Figure 6:
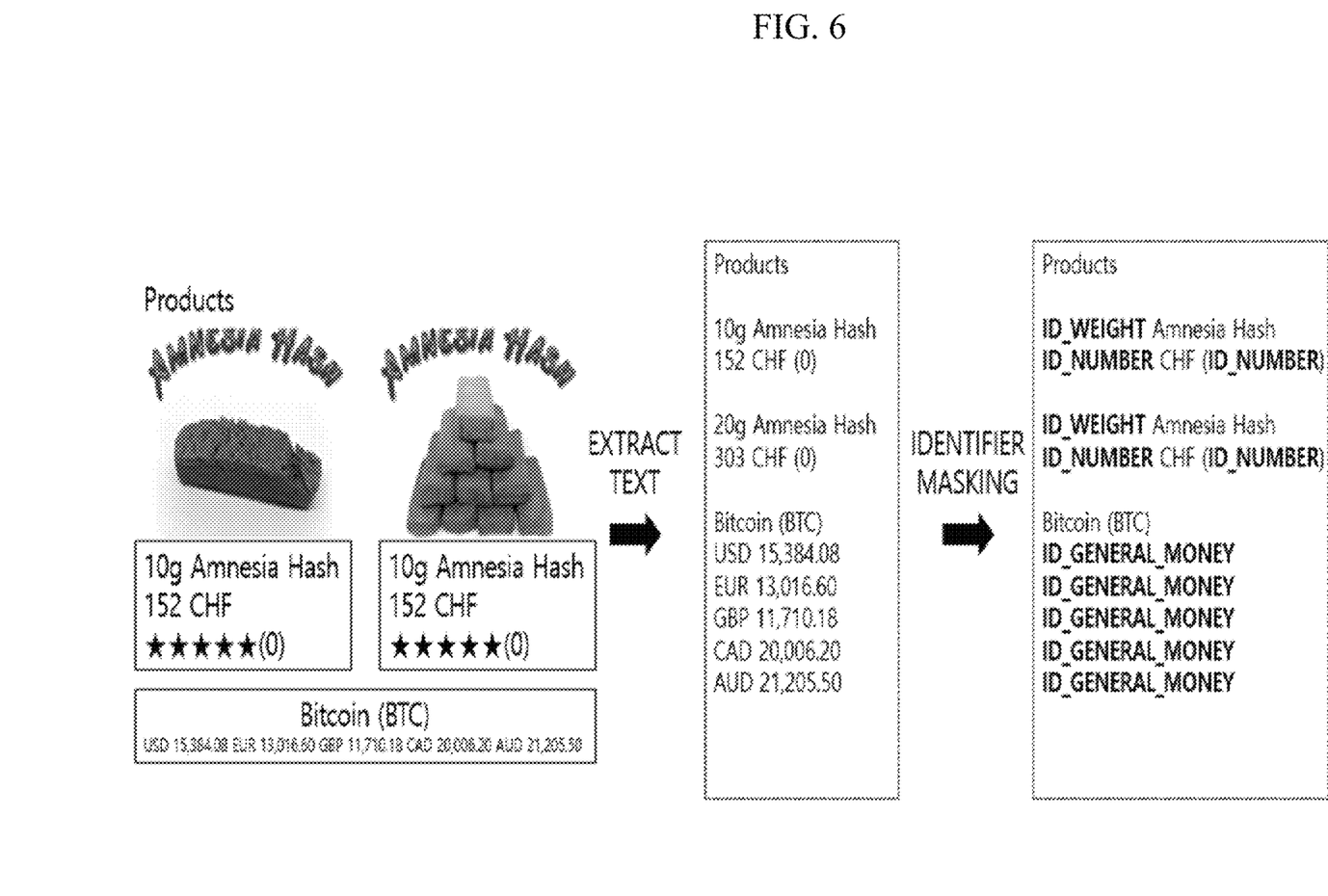
FIG. 6 is an example of identifier masking to which the present disclosure may be applied.

FIG. 6 is an example of identifier masking to which the present disclosure may be applied.

Referring to FIG. 6, the terminal may extract text from the dark web document collected through the URL of the dark web URL repository and mask the target identifiers.

In addition, when the top 3 in the frequency of the masked identifiers of the document are "weight," "volume" and "cryptocurrency amount," the AI model may determine that the document is highly likely to be a drug-related document.

Referring back to FIG. 4, the terminal may perform operation 2, a content similarity calculation operation, to determine a duplicate of a document.

Figure 7:
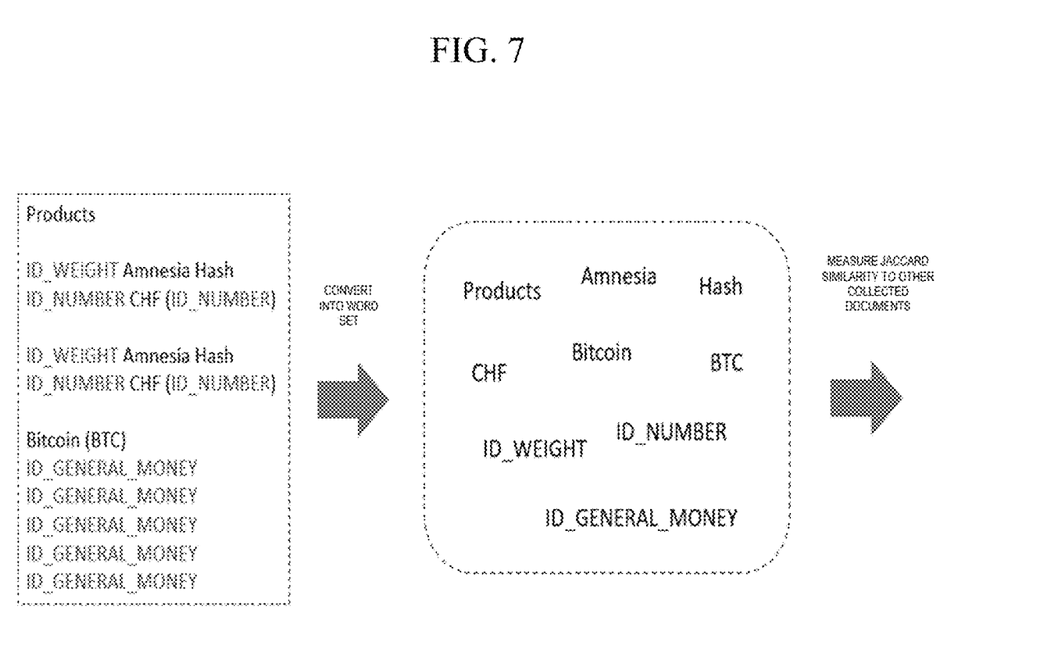
FIGS. 7 and 8 are an embodiment of a duplicate determination method to which the present disclosure may be applied.
Figure 8:
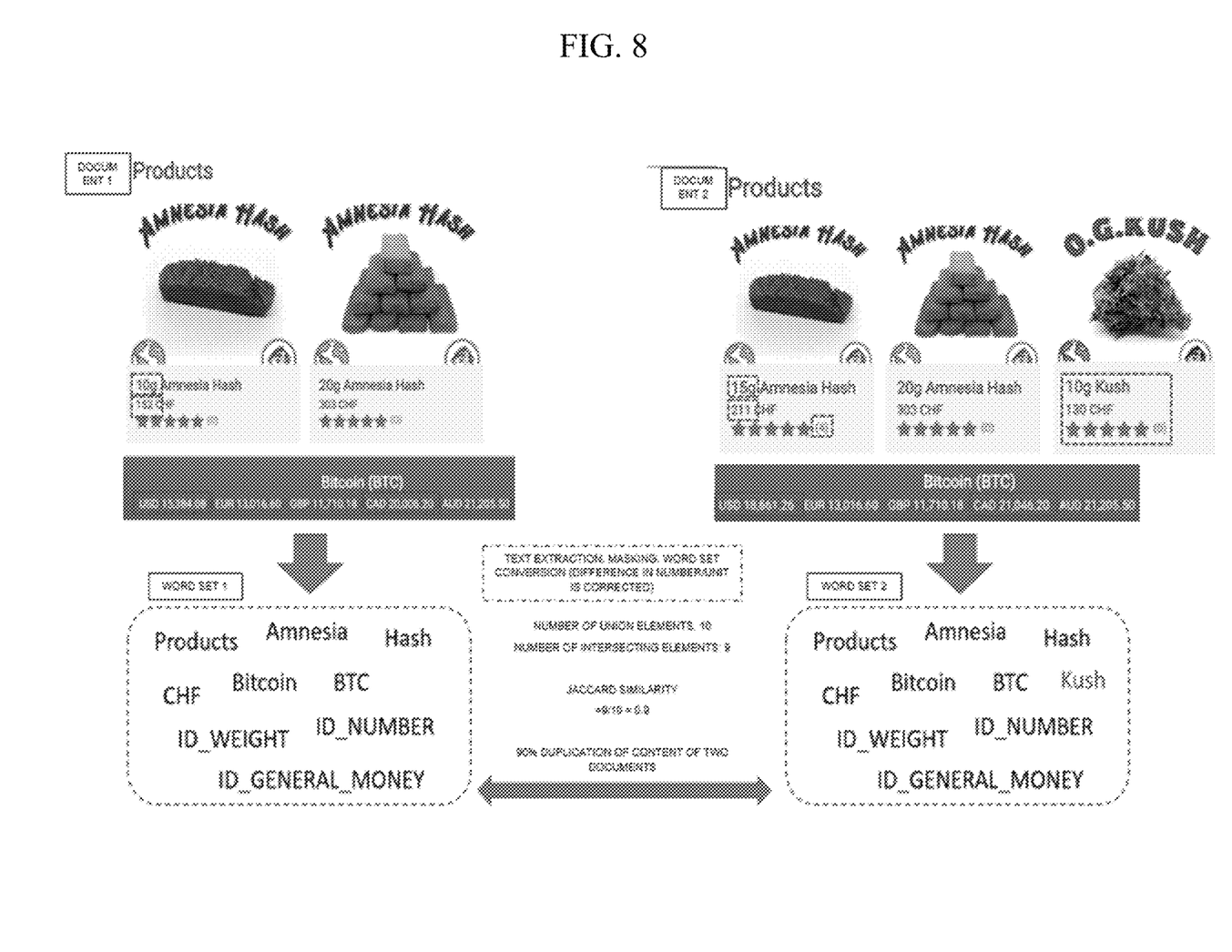

FIGS. 7 and 8 are an embodiment of a duplicate determination method to which the present disclosure may be applied.

Referring to FIG. 7, the terminal may determine the duplicate of the dark web document, and may use Jaccard similarity for this purpose.

The terminal converts the masked text into a word set (excluding special characters such as parentheses and commas), and compares the word set with collected and stored documents one by one to determine whether there is a duplicate.

For example, when determining whether two documents are duplicates, the terminal may convert each document into the word set and then calculate the Jaccard similarity in the word set, thereby determining that there is a duplicate when the similarity is equal to or less than a specific value.

The Jaccard similarity is a technique that expresses the similarity of element distribution between two sets as a value between 0 and 1, and a similarity closer to 1 may indicate higher similarity.

Referring to FIG. 8, the terminal may determine whether a document 1 and a document 2 are duplicated. The terminal may extract text from the document and obtain the word sets 1 and 2 through the identifier masking.

When the total number of union elements is 10 and the number of intersecting elements is 9, the Jaccard similarity may be obtained as 0.9, and when the specific value is equal to or greater than 0.8, the terminal may determine that the document 2 is a duplicate of the document 1, and may not collect the document 2.

This similarity calculation method may be applied differently depending on the subject of the document (dark web page) to be classified.

For example, in order to determine that two documents are duplicates in content, the threshold value of the Jaccard similarity may be set differently depending on the subject of the documents (as the threshold value decreases, even slight duplication of distribution of words is considered a duplicate).

Example 1: Since there are so many pornography sites on the dark web and the degree of duplication of content between these sites is very high, the similarity threshold value is set low, so a criterion may be applied to "consider that even moderate duplication of the distribution of words between two pages is a duplicate."

For example, when the threshold value is set to be 0.5, two pages may be determined to be duplicates of each other even if the distribution of words is duplicated between them only by half. In this case, much duplicate filtering is performed during the collection of documents, and accordingly, various (i.e., less duplicated) pages may be collected.

Example 2: In the case of a weapon sales site, since it is difficult to collect various pages in the first place because there are not many sites on the dark web, the similarity threshold value is set high, so a criterion may be applied to consider that "a case in which the distribution of words between two pages is duplicated very much is a duplicate."

For example, when the threshold value is set to be 0.9, two pages may be determined to be duplicates of each other only when the distribution of words is duplicated by more than 90%. In this case, as long as the distribution of words is not duplicated too much, since pages are regarded as different pages, less filtering is performed during the collection, so the absolute collection amount may be increased.

Through the above-described method of collecting dark web documents, the terminal may secure diversity of collected documents by maximally avoiding the duplication of content between documents even when collecting the same amount of documents by removing the duplicates of content and masking unnecessary identifiers. That is, the terminal may secure high-quality machine learning data with high diversity.

In addition, since the terminal may avoid labeling duplicate documents required in a process of constructing the learning data, unnecessary labeling costs may be avoided.

As a result, the terminal may construct the high-quality learning data of the AI model for the subject classification of the dark web.

Figure 9:
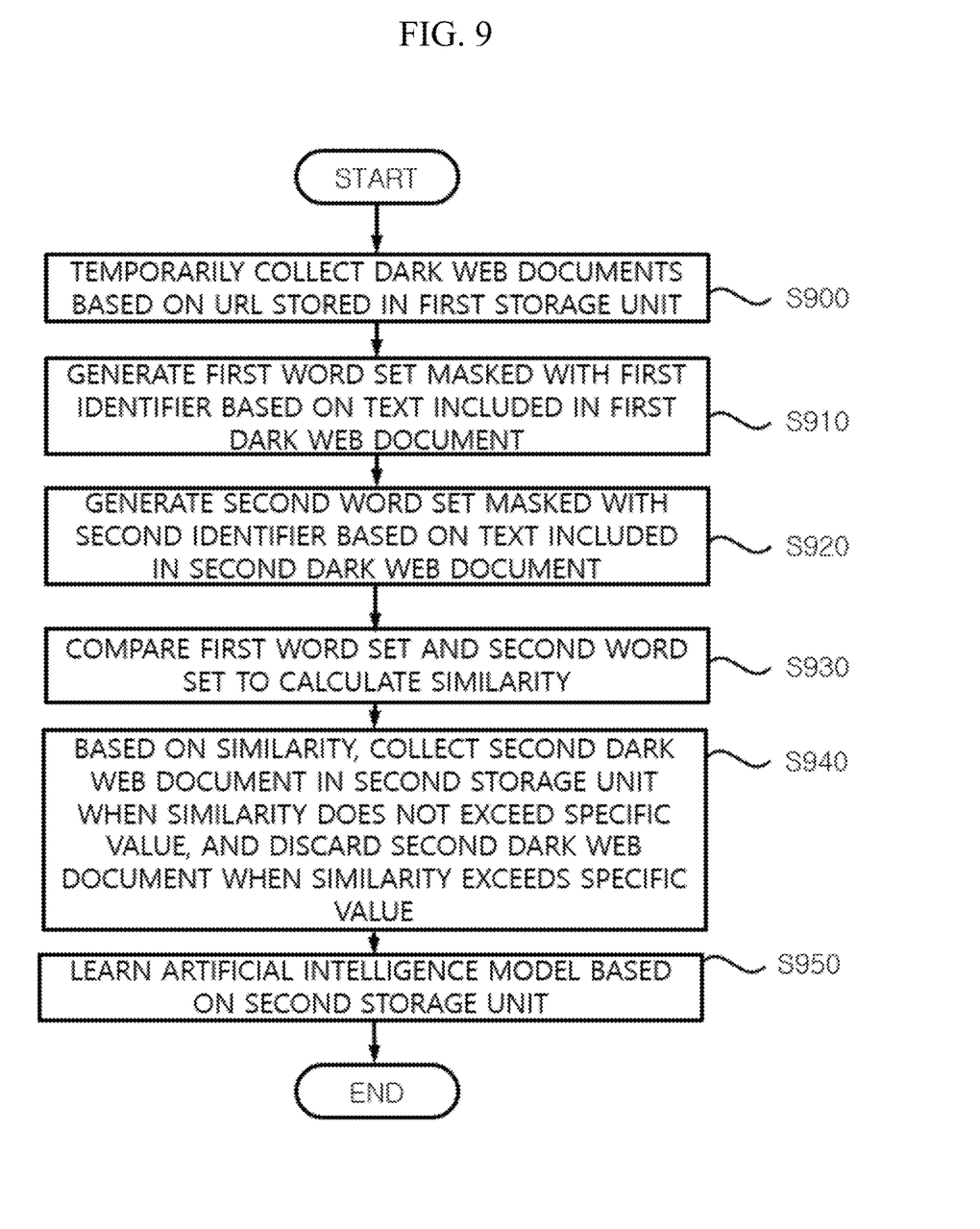
FIG. 9 is an embodiment of a terminal to which the present disclosure may be applied.

FIG. 9 is an embodiment of a terminal to which the present disclosure may be applied.

Referring to FIG. 9, the terminal may include a first storage unit that stores a URL of a dark web, a second storage unit that stores a dark web document to be used as learning data, and a processor for controlling the first and second storage units.

The terminal temporarily collects dark web documents based on the URL stored in the first storage unit (S900). The temporarily collected dark web documents may include a first dark web document and a second dark web document to be described below.

The terminal generates a first word set masked with a first identifier based on text included in the first dark web document (S910).

The terminal generates a second word set masked with a second identifier based on text included in the second dark web document (S920).

The above-described masking is based on an identifier table set in the terminal, and this identifier table may include (1) the type of the masked identifier and (2) the subject information related to the masked identifier (see Table 1).

The terminal compares the first word set and the second word set to calculate similarity (S930).

Based on the similarity, the terminal collects the second dark web document in the second storage unit when the similarity does not exceed a specific value, and discards the second dark web document when the similarity exceeds the specific value (S940).

The terminal may mask the temporarily collected dark web documents, and then calculate the similarity with the first dark web document. Thereafter, the same operation may be performed on other dark web documents.

For example, the masking may be an operation of converting words included in the text of the dark web document into an identifier indicating a higher meaning.

For example, the similarity may be Jaccard similarity, based on the union and intersection of the first word set and the second word set.

For example, the specific value may be set based on the subject information related to the identifier to be masked.

The terminal trains the AI model based on the second storage unit (S950). The AI model may use the subject information of the dark web considered in the above-described operation for the dark web classification.

The present disclosure described above permits the program to be embodied as computer readable code on a medium on which the program is recorded. Computer readable media may include all kinds of recording devices in which data that may be read by a computer system is stored. Examples of the computer readable medium may include a hard disk drive (HDD), a solid state disk (SSD), a silicon disk drive (SDD), a read only memory (ROM), a random access memory (RAM), a compact disc read only memory (CD-ROM), a magnetic tape, a floppy disk, an optical data striate, and the like, and also include a medium implemented in the form of carrier waves (for example, transmission through the Internet). Therefore, the above-described detailed description is to be interpreted as being illustrative rather than being restrictive in all aspects. The scope of the present disclosure should be determined by reasonable interpretation of the appended claims, and all changes within the equivalent scope of the present disclosure are included in the scope of the present disclosure.

According to the present disclosure, it is possible to collect and preprocess learning data of an AI model to perform dark web document classification using deep learning technology.

Effects which may be achieved by the present disclosure are not limited to the above-described effects. That is, other objects that are not described may be obviously understood by those skilled in the art to which the present disclosure pertains from the following description.

In addition, although services and embodiments have been mainly described hereinabove, this is only an example and does not limit the present disclosure. Those skilled in the art to which the present disclosure pertains may understand that several modifications and applications that are not described in the present disclosure may be made without departing from the essential characteristics of the present services and embodiments. For example, each component described in detail in the embodiments may be modified. In addition, differences associated with these modifications and applications are to be interpreted as being included in the scope of the present disclosure as defined by the following claims.

What is claimed is:

1. A method of collecting, by a terminal, learning data of an artificial intelligence model to perform dark web document classification, the method comprising:

generating a first set of words by masking text included in a first dark web document with a first identifier;

generating a second set of words by masking text included in a second dark web document with a second identifier;

calculating a similarity by comparing the first set of words and the second set of words; and based on the similarity, collecting the second dark web document in a second storage unit when the similarity does not exceed a specific value, and discarding the second dark web document when the similarity exceeds the specific value, wherein the similarity is a Jaccard similarity based on a union and an intersection of the first set of words and the second set of words.

2. The method of claim 1, further comprising temporarily collecting dark web documents based on a uniform resource locator (URL) stored in a first storage unit, wherein the temporarily collected dark web documents include the first dark web document and the second dark web document.

3. The method of claim 1, wherein the masking is based on an identifier table set in the terminal, and the identifier table includes (1) a type of masked identifier and (2) subject information related to the masked identifier.

4. The method of claim 3, wherein the masking converts a word included in the text into an identifier indicating a meaning of the word.

5. The method of claim 3, wherein the specific value is set based on the subject information related to the masked identifier.

6. The method of claim 5, further comprising training the artificial intelligence model based on the second storage unit.

7. A terminal that collects learning data of an artificial intelligence model to perform dark web document classification, the terminal comprising:

a first storage unit configured to store a uniform resource locator (URL) of a dark web;

a second storage unit configured to store a dark web document to be used as the learning data; and a processor configured to functionally control the first storage unit and the second storage unit, wherein the processor generates a first set of words by masking text included in a first dark web document with a first identifier, generates a second set of words by masking text included in a second dark web document with a second identifier, compares the first set of words and the second set of words to calculate a similarity, and based on the similarity, collects the second dark web document in the second storage unit when the similarity does not exceed a specific value, and discards the second dark web document when the similarity exceeds the specific value, wherein the similarity is a Jaccard similarity based on a union and an intersection of the first set of words and the second set of words.

8. The terminal of claim 7, wherein the masking is based on an identifier table set in the terminal, and the identifier table includes (1) a type of masked identifier and (2) subject information related to the masked identifier.

* * * * *